Jan. 17, 1967 H. A. SWOBODA 3,298,869
LAMINATED BATTERY SEPARATORS
Filed Aug. 23, 1961

INVENTOR.
HERMAN A. SWOBODA
BY
Paul M. Phillips
ATTORNEY

United States Patent Office 3,298,869
Patented Jan. 17, 1967

3,298,869
LAMINATED BATTERY SEPARATORS
Herman A. Swoboda, Verona, N.J., assignor to Amerace Corporation, New York, N.Y., a corporation of Delaware
Filed Aug. 23, 1961, Ser. No. 133,464
5 Claims. (Cl. 136—145)

The present invention relates to laminated battery separators and more particularly to a product comprising a two-ply separator, wherein one of said plies is formed of a rubber composition such as those used conventionally in the forming of micro-porous hard rubber battery separators and the other ply is formed of a layer of felted fibers, such as paper or the like, which is impregnated with a cured resin, but still is sufficiently porous to serve its function as a battery separator.

The resin which is usable for impregnating the fibrous or paper layer of the product may be either a thermoplastic or a thermosetting resin and usually is of the latter variety. Among the thermosetting resins which have been found to be effective and desirable in use are resins of the phenol-aldehyde type, particularly when mixed with a relatively small proportion, for example, 5% based on the total resin present, of a melamine resin.

Thermoplastic resins may also be used, such, for example, as the polyacrylic resins, a detailed example of which will be given hereinafter.

In either case, it has been found that it is necessary for the resin to be substantially cured after impregnating the paper or fibrous web therewith and prior to the lamination of this web with the rubber composition layer.

The amount of resin used under these circumstances is substantially less than that which would be usable or required if an all-paper battery separator were to be made using impregnated paper as is common in the prior art. In the present instance, the resin content used is in the range of about 15–25%, based upon the dry weight of resin plus paper or, in other terms, at least about one part resin to five parts paper.

While materials such as those of each of the plies have been separately used in making up the whole of a battery separator respectively, as far as is known, these materials have not been formed into a laminated-type separator in such a manner that the laminations are prevented from becoming disassociated with one another by the peculiar characteristics of certain of the materials themselves coupled with the peculiar and novel method by which these laminated separators are formed, the method itself forming a part of the present invention.

It has been customary in the past to form battery separators of micro-porous hard rubber compositions, such, for example, as are disclosed in the U.S. Baty et al. Patent No. 2,329,322, granted September 14, 1943. Compositions of this general type and a manner of making rubber separators with paper which is later stripped off the separator is also disclosed in the Schelhammer et al. U.S. Patent No. 2,274,260, granted February 24, 1942.

The present invention is effected in substantially the same way that is taught in the Schelhammer patent, with the notable exception that the paper in the Schelhammer patent is used as a reenforcing material solely during the manufacture of the rubber battery separators and is peeled off from the rubber prior to use. In the present case the paper or other sheet of felted fibers is of such character that it is firmly attached during the manufacturing process so that it is never separated nor in fact is it reasonably separable from the rubber.

It is also recognized that battery separators have for some years been made from paper or other fibrous materials impregnated with a resin such as a phenol-aldehyde resin. Here again, however, while the fibrous or paper ply of the present invention is similar in some respects to prior art impregnated paper separators, the present invention is distinguished by the fact that the fibrous and rubber layers are permanently laminated together throughout their areas. This results in a substantial reduction in the cost of the final product, as it is possible to make a product which is considerably thinner than if only rubber were used, due to the strengthening effect of the permanently attached fibrous material ply. Furthermore, the present product is superior in its manufacturing requirements to the product disclosed in the Schelhammer et al. patent as in that product labor was necessarily expended in stripping the paper from the finished vulcanized rubber material. Such paper cannot be reused; and even the disposal of the long paper strips separated from the cured rubber body constitutes a substantial problem.

The present product is superior in many respects to the solely rubber separators, as the presence of the paper ply, permanently attached, serves to reenforce the rubber during the certain operations used in making separators for use under conditions where close tolerances are required, namely, where the height of the ribs must be very accurately predetermined and this desired height is secured by forming the ribs somewhat oversized and then grinding them to the desired thickness subsequent to the vulcanization of the rubber. The rubber material compounded in the way which is required for this use is not only hard, but also somewhat brittle, and is subject to breaking or cracking during this grinding operation. This is not the case in connection with the present product.

The present product is also relatively resistant against what is sometimes termed "raised webs," i.e. a buckling or bowing of some portions of the separator between adjacent ribs.

The present product has been found to be superior to either solely rubber or solely impregnated paper separators in view of the fact that pores which may exist in either layer are, in practically all instances, not disposed in registry with one another, so that the detailed inspection normally required for rubber separators and the subsequent patching of the holes found therein, by putting such separators over a lighted inspection table is practically eliminated by the use of the present product.

Other and more detailed objects and advantages of the present process and of the present product will appear as the description proceeds and will be pointed out in or inherent from the subject matter of the appended claims. The invention will be better understood by reference to the accompanying drawings, in which:

Figure 1:
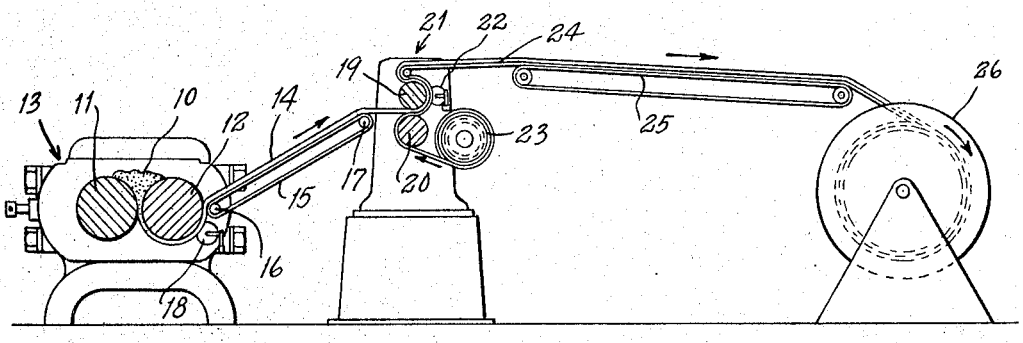
FIG. 1 is a more or less diagrammatic illustration, principally in elevation, showing the general process of laminating together a rubber composition layer and a paper or fibrous material layer, the rubber composition being first compounded in a desired manner and the paper or fibrous material layer being first pretreated with a thermosetting resin.

Considering now the manufacture of the present separators in detail and considering first the rubber composition as such, it includes the use of compositions similar, for example, to those particularly disclosed in the first column on page 2 of the Baty et al. Patent No. 2,329,322, including rubber, sulfur, a vulcanization accelerator, filler and a silicic acid gel or hydrogel. Inasmuch as the prior art has been familiar with such compositions and the making thereof for a considerable number of years, and as a particular example is given in the patent noted and another example is given in the Schelhammer et al. patent aforesaid, no further specific details of rubber compositions will be set out herein as the particular make-up of the rubber composition per se forms no part of the present invention. Sufficient be it to say, however, that all of these compositions include a natural or artificial rubber, sulfur for the vulcanization thereof, one or more vulcanizing agents as may be desired, and a hydrated silicic acid gel, the last of which, on drying, provides the pores necessary in a micro-porous battery separator. There may also be included the usual or desired fillers, pigments and the like as is conventional in the compounding of hard rubber compositions.

In the Baty et al. patent aforesaid, the disclosure and certain of the broader claims include a statement of the range of 60–85% water in the silica gel which is used in the rubber composition prior to the vulcanization thereof. These limits, however, have not proved to be practical in commercial manufacture. The commercial limits which have been found best suited for regular use have been 74–76% water in the silica gel when making an all-rubber micro-porous separator. In the present instance, however, when the separator is to be a laminated one with a layer of rubber and a layer of impregnated paper, a different range of water content in the silica gel has been found to be highly desirable and practically necessary, this range being from about 68–73%. In other words, a somewhat lower water content is here needed than has commercially been found practical when making all-rubber battery separators.

The composition in this case is mixed together in a manner conventional for the compounding of rubber compositions and with the silica gel in a hydrated condition and not dried out. The laminating step, hereinafter described, is carried on prior to either the drying of the silica gel component of the composition or the vulcanization of the rubber composition.

The paper used in this case or other equivalent fibrous sheet material per se forms no part of the present invention as to its particular composition. However, in order that this disclosure may be reasonably complete, an example is now given of a satisfactory type paper and something of the manner of preparation thereof. As an example of a satisfactory paper, one may use a 100% high-alpha-content cellulose fiber cooked by the alkaline process. In the making of this fiber the bulk of the wood used for conversion to papermakers' fiber could be classified as long-leaf pine—60% ±5% and short-leaf pine, the balance. This paper may be fabricated by conventional papermaking methods such, for example, as the use of a Fourdrinier machine, and is then impregnated in any suitable manner using suitable resin or combination thereof.

In the event that a thermosetting resin is used, such as a phenol-aldehyde resin, preferably mixed with about 5% of a melamine resin, then it has been found practically necessary that the impregnated paper or fiber layer be not only dry, but heated to the extent necessary so as to mature the resin to its final state, sometimes known as the "C" state all prior to the lamination step. If this were not done, experience has shown that the lamination will not secure permanent adhesion between the layers throughout their areas. Thus, for example, it has been attempted to use a phenol-aldehyde resin in the "A" or the "B" state, then cure the resin at the same time that the rubber is being vulcanized. Such attempts have generally ended in failure in that the product tended quickly and easily to delaminate.

Where the resin used is a thermoplastic resin, the attainment of a so-called cured state is merely the result of bringing the temperature of the impregnated body down to substantially room temperature, i.e., about 20° C., which is the condition under which the lamination step of the process hereinafter described is normally accomplished. In other words, no particular effort need be spent on either warming or cooling the resin or the room in which the lamination operation takes place, but this operation may be carried on under ordinary factory operating conditions.

The amount of resin required in impregnating the paper or other fibrous material is also of importance in this case. In accordance with the present invention this amount is from about 15% to about 25% by weight, based upon the total dry weight of paper plus resin. From another point of view, it is found that there should be at least about one part by weight of resin for every five parts by weight of paper. This range of resin in the impregnated paper is substantially less than that which has been considered necessary in impregnated paper battery separators which are now in common use in the art. In the present instance the limits for the amount of resin are dictated in the following manner: the lower limit is that amount of resin which is required to keep the paper in a sufficiently rigid or permanent condition in the environment in which it is normally used, i.e. immersed in battery acid, which is an aqueous solution of sulphuric acid of varying concentrations dependent upon the amount of charge in the battery. When the resin content is too low, the paper layer is not sufficiently permanent and is rapidly consumed by the acid resulting in the total destruction of the paper layer. On the other hand, when the amount of resin present is more than about 25% as hereinabove set forth, the impregnated paper is too brittle for practical use. These limits apply both to the thermosetting and to the thermoplastic resins, with a preferred amount in each instance being about 20% by weight.

It is noted that in making a laminated separator in accordance with the present invention, the paper used is substantially thinner than when making an all-impregnated paper separator and also the separator as a whole is substantially thinner than is a separator made wholly of micro-porous rubber composition.

Referring now more particularly to the drawings, a mass of a rubber composition, prepared as aforesaid, is shown at 10 resting on rolls 11 and 12 of a mill 13, which delivers a preliminary strip 14 of the uncured permeable hard rubber composition onto a conveyor belt 15 which passes over rolls 16 and 17. Suitable means (not shown) are provided for driving at least one of these rolls and also separately for driving the rolls 11 and 12. Alternatively, a single means may be provided for driving the rolls 11 and 12 and also for driving the conveyor belt 15, so as to coordinate them together as to speed. As the preliminary strip 14 is delivered from the roll 12, it may be trimmed to proper width by suitable cutters 18, only one of which is shown. The preliminary strip 14 of the rubber composition is thicker than that desired for the final rubber sheet or ply thereof.

From the conveyor belt 15 this sheet is delivered to calender rolls 19 and 20 of a calender generally indicated at 21 of usual construction. These calender rolls are spaced apart the necessary distance to reduce the preliminary strip of rubber composition 14 to the overall thickness desired in the finished article, which is from about 0.01 to about 0.04 or higher inch. The desired thickness is dependent on the particular application; thus for ordinary auto batteries the thickness is preferably a minimum and is about 0.01 to about 0.015 inch.

In most instances, battery separators are formed flat on one side and ribbed on the other, and accordingly, the lower calender roll 20 will be provided with a smooth cylindrical surface; whereas the upper or profile roll 19 will be grooved circumferentially to provide the desired ribs on the upper surface of the laminated strip, the ribs being thus formed solely of the rubber composition.

Since the preliminary strip of the rubber composition is squeezed to some extent to reduce the strip to the desired thickness, it may expand laterally; and cutters 22 (only one of which is shown) are provided to trim the rubber composition portion of the laminated strip emerging from the calender rolls to the requisite width.

As the preliminary strip 14 of the rubber composition passes between the calender rolls, a strip of impregnated paper of the character hereinabove set out is applied to one side of the rubber strip. For this purpose a supply roll of the impregnated paper is provided at 23 and the strip led therefrom around the lower roll 20, so as to be pressed firmly against the strip of rubber between the rolls 19 and 20. At this time, due to the porous character of the paper and the substantially plastic character of the rubber composition, portions of the rubber composition will be forced into the interstices or pores in the paper strip. At the same time, due to the fact that the paper strip is in itself not an exactly smooth and finished body, some fiber ends of the paper fibers will extend outwardly from the paper and will be embedded in the relatively soft rubber composition layer also during the calendering operation. The composite or laminated strip shown at 24 is then conveyed in any suitable manner, as by a conveyor 25, to a take-up reel 26, the conveyor and the take-up reel being suitably driven in a manner which is not shown but may be conventional in the art.

In the usual course of manufacture, the paper web of the present invention will be formed on a paper-making machine such as a Fourdrinier machine. As such, the lower side of the web as formed, which is sometime known as the "wire side," will be formed of fibers which are closer together and have less and/or smaller interstices than the upper side of the web as formed, which is sometimes known as the "felt side." It is preferable, in accordance with the present invention, that the so-called felt side of the web be placed in juxtaposition with the rubber layer in laminating these two layers or plies together, as this provides larger and/or more interstices in the paper layer or ply into which the soft rubber may extend during the lamination process, so that when the rubber is later vulcanized, the laminations will be more securely interlocked together. This arrangement also serves to provide the paper surface of the laminated product with the relatively close knit surface which was the wire side of the paper as first made and which, therefore, is better able to resist abrasive wear than the other side of the paper which was placed against the rubber layer.

The curing process per se may be carried on in a substantially conventional manner similar to that taught, for example, in the Schelhammer et al. Patent No. 2,274,260 aforesaid. To summarize this step of the process, the laminated strip formed in the present application is coiled up and placed in a closed vessel, similar to an autoclave, and the rubber ply thereof is cured by holding it in this closed vessel preferably for about ¾ hour to one hour at a temperature of about 300–350° F., and preferably at about 355° F., at a total pressure of about 130–140 p.s.i.g.

Figure 2:
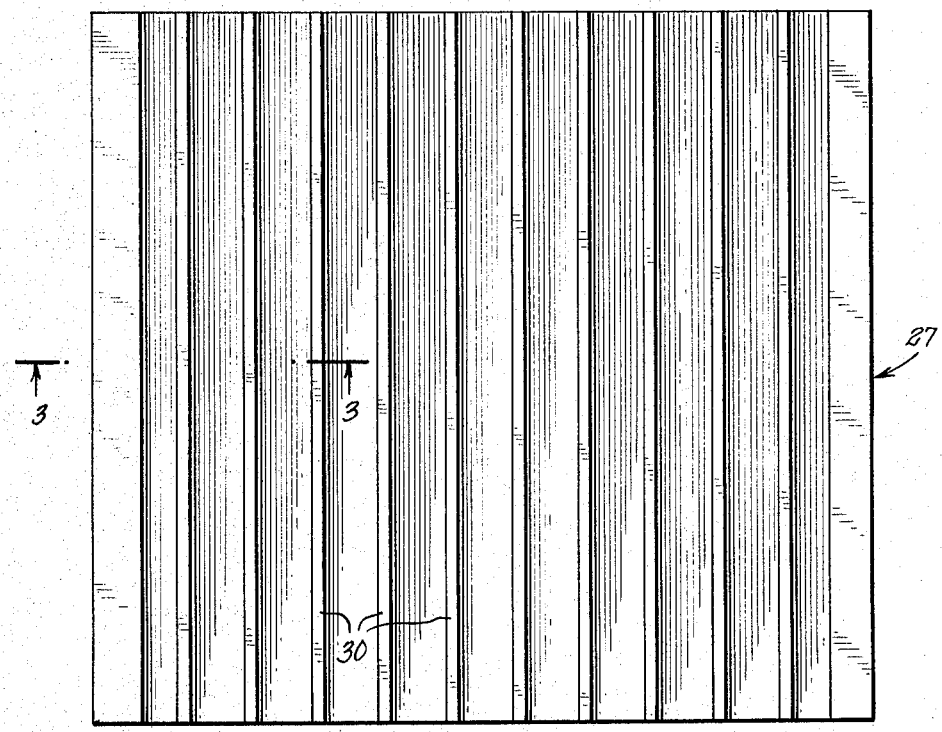
FIG. 2 is a face view of a rubber separator including parallel ribs embodying the present invention.
Figure 3:
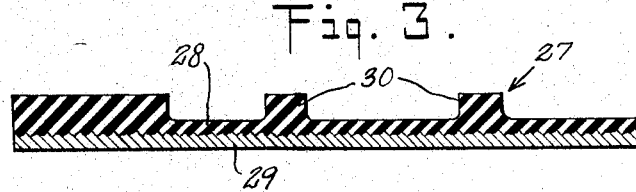
FIG. 3 is a view of a portion of the separator in section one the line 3—3 of FIG. 2 and on an enlarged scale.

The final product in this case is shown in FIGS. 2 and 3 and comprises a laminated strip generally illustrated at 27 and including a relatively thin micro-porous hard rubber ply 28 and a relatively thin resin-impregnated fibrous ply 29. Some of the hard rubber material extends into what were previously pores in the surface of the paper and some of the paper fibers extend into the rubber ply, so that the two plies 28 and 29 are permanently laminated together throughout their areas.

It is found that the final product so prepared and constituted is laminated together in such an intimate manner that it is substantially impossible to separate the plies without completely destroying one or both. The paper or fibrous material ply 29, while preferably having a thickness of only about 0.005 to about 0.020 inch, is still sufficiently thick and strong to provide the necessary reenforcement for the rubber ply 28 and thus minimize in the use of the more expensive rubber composition. At the same time, the ribs shown at 30 are formed solely of the rubber composition material, so as not to require any deformation of the paper and any straining of the intermeshing of the fibres thereof which might tend to weaken it. Thus the paper layer is maintained smooth by training it around the smooth roll 20 and by the subsequent treatment, none of which tends to cause buckling or other straining of the paper or the fibers thereof.

Following the particular process above described including the vulcanization step, there remains merely to dry out the material, so as to cause the rubber layer to be micro-porous by the drying of the silica hydrogel and cutting the strip into necessary size pieces for use as battery separators or the like.

It will be understood that while the fiber strip from the supply roll 23 and the ply 29 formed therefrom have been referred to in many places in the present description as "paper," this term is intended to be construed to include any relatively thin layer of any suitable fibrous material, wherein the fibers are felted together and wherein they are suitably treated by impregnation with a suitable resin or a mixture thereof.

It is further contemplated that laminated materials formed in accordance with the present invention, and with or without the ribs 30, could be used for battery separators or for other purposes. In such event, it is intended that both the method of this invention and the product produced thereby and forming a part thereof shall be considered to include such other uses as the product may be adapted for.

The following are examples of resin compositions which have been found usable in making impregnated paper in accordance with this invention:

(a) As a thermosetting resin—a phenol-formaldehyde resin which is from 70–72% solids and has a viscosity of 800–1200 cps., a pH of 7.9–8.3 and a specific gravity of 1.250–1.255. Such a resin has a water miscibility of 200–600%, contains about 1.0 maximum free formaldehyde and is capable of being cured on a hot plate basis in 60–80 seconds.

(b) As a thermoplastic resin, ethyl acrylate 80–90 mol percent, methyl methacrylate—4–16 mol percent, methacrylic acid—4–6 mol percent, the resin itself being a copolymer of these materials.

In either case the paper stock may be formed on a suitable paper machine and then dried on drying cans having a surface temperature of 285° F. until completely bone dry. The paper may then be passed through an aqueous solution of the resin and carried to an in-line oven and there cured at an oven temperature of 600° F. for one minute (for the thermosetting resin, but the cure is not necessary in the case of the thermoplastic resin which merely requires cooling to room temperature). Following the curing, there is preferably about ¾ to 1½% residual moisture remaining in the product material, which is desirable for handling purposes. In using the thermosetting resin, it may be dissolved in a suitable alcohol for purposes of saturation impregnation of the paper stock, such an alcohol being isopropanol with 50% water. Suitable modifications of this process may be made when using the thermoplastic resin, all of which will occur to those skilled in the art from the foregoing, it being specifically contemplated that a solvent such as alcohol or the like may be used with any suitable resin for the purpose of facilitating the saturation of the paper therewith, so as to leave the desired amount of resin in the paper in the proportions hereinabove given which are on a dry basis and by weight.

While an attempt has been made as the description proceeded to point out alternatives and equivalents, other equivalents will suggest themselves to those skilled in the art from the foregoing description. I do not wish to be limited, therefore, except by the scope of the appended claims, which are to be construed validly as broadly as the state of the art permits.

What is claimed is:

1. A battery separator consisting of a two-ply permanently joined and laminated body, in which one ply of said body is made up of a vulcanized rubber composition, which is micro-porous, and in which the other ply of said body is made up of a porous sheet of felted fibers impregnated with about 15–25% of cured resin selected from a group consisting of thermosetting and thermoplastic resins based on the dry weight of resin plus fiber sheet; and said two plies being intimately and permanently interlocked together throughout with portions of said rubber composition extending into pores in said ply of felted fibers, and with extended end portions of some of said fibers extending into and being embedded in said rubber composition.

2. A battery separator in accordance with claim 1, in which said resin consists essentially of a phenol-aldehyde resin and contains a minor portion of melamine resin.

3. A battery separator in accordance with claim 1, in which said resin is a thermoplastic resin of the polyacrylic type.

4. A battery separator in accordance with claim 1, in which said resin is a thermoplastic resin of the polyacrylic type consisting essentially of a copolymer of the following materials:

| | Mol percent |
|---|---|
| Ethyl acrylate | 80–90 |
| Methyl methacrylate | 4–16 |
| Methacrylic acid | 4–6 | there being at least one part by weight of resin to five parts by weight of fiber in the impregnated fibrous product which is laminated with a rubber composition layer in the final body.

5. A battery separator in accordance with claim 1, in which the sheet of felted fibers forming a part of said laminated body is one having prior to the lamination a relatively dense surface and a relatively porous surface, and in which the laminated body is made up with the relatively porous surface of this fibrous sheet contiguous with the rubber composition ply, so as to facilitate the interlocking of the plies and so as to present a surface having a maximum of resistance to wear on the outside of the fiber composition ply in the completed article.

References Cited by the Examiner

UNITED STATES PATENTS

| | | | |
|---|---|---|---|
| 2,274,260 | 2/1942 | Schelhammer et al. | 156—501 X |
| 2,329,322 | 9/1943 | Baty et al. | 260—722 |
| 2,531,504 | 11/1950 | Dillehay et al. | 136—145 |
| 2,937,968 | 5/1960 | Sauer | 156—242 |
| 2,978,529 | 4/1961 | Brisley et al. | 136—145 |

FOREIGN PATENTS

| | | |
|---|---|---|
| 451,628 | 8/1936 | Great Britain. |
| 843,452 | 8/1960 | Great Britain. |

EARL M. BERGERT, *Primary Examiner.*

H. L. GATEWOOD, T. R. SAVOIE,

*Assistant Examiners.*